United States Patent
Nagao et al.

(10) Patent No.: US 10,780,423 B2
(45) Date of Patent: Sep. 22, 2020

(54) POWDER FOR CATALYSTS AND CATALYST FOR EXHAUST GAS PURIFICATION

(71) Applicant: MITSUI MINING & SMELTING CO., LTD., Tokyo (JP)

(72) Inventors: Yuki Nagao, Saitama (JP); Yunosuke Nakahara, Saitama (JP); Takanori Masaki, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 0 days.

(21) Appl. No.: 15/765,481

(22) PCT Filed: Nov. 15, 2016

(86) PCT No.: PCT/JP2016/083804
§ 371 (c)(1),
(2) Date: Apr. 2, 2018

(87) PCT Pub. No.: WO2017/086308
PCT Pub. Date: May 26, 2017

(65) Prior Publication Data
US 2019/0070590 A1    Mar. 7, 2019

(30) Foreign Application Priority Data

Nov. 17, 2015  (JP) ................................ 2015-225102

(51) Int. Cl.
| | | |
|---|---|---|
| *B01J 23/63* | (2006.01) | |
| *B01J 23/10* | (2006.01) | |
| *B01D 53/94* | (2006.01) | |
| *F01N 3/10* | (2006.01) | |
| *B01J 32/00* | (2006.01) | |
| *F01N 3/28* | (2006.01) | |

(52) U.S. Cl.
CPC .............. *B01J 23/63* (2013.01); *B01D 53/94* (2013.01); *B01D 53/945* (2013.01); *B01J 23/10* (2013.01); *B01J 32/00* (2013.01); *F01N 3/10* (2013.01); *F01N 3/2807* (2013.01); *F01N 3/2832* (2013.01); *B01D 2255/1023* (2013.01); *B01D 2255/2065* (2013.01); *B01D 2255/20715* (2013.01); *B01D 2255/908* (2013.01); *F01N 2330/06* (2013.01); *F01N 2330/08* (2013.01); *F01N 2370/04* (2013.01)

(58) Field of Classification Search
CPC . B01J 23/63; B01J 23/10; B01J 32/00; B01D 53/945; B01D 53/94; F01N 3/2807; F01N 3/2832; F01N 3/10
See application file for complete search history.

(56) References Cited

U.S. PATENT DOCUMENTS

| | | |
|---|---|---|
| 2007/0129246 A1 | 6/2007 | Miura |
| 2009/0124491 A1 | 5/2009 | Miura et al. |
| 2014/0037524 A1 | 2/2014 | Hideki et al. |
| 2014/0038818 A1 | 2/2014 | Akihiro et al. |
| 2015/0290621 A1* | 10/2015 | Miura .................... C01G 25/00 502/304 |
| 2016/0250620 A1* | 9/2016 | Morikawa .............. C01G 25/00 502/303 |

FOREIGN PATENT DOCUMENTS

| | | |
|---|---|---|
| JP | H7171392 A | 7/1995 |
| JP | 2004243177 A | 9/2004 |

(Continued)

OTHER PUBLICATIONS

Atribak, Idriss et al. "Influence of the physico-chemical properties of $CeO_2$-$ZrO_2$ mixed oxides on the catalytic oxidation of NO and NO2," Applied Surface Science, 2010, p. 7706-7712, vol. 256, Elsevier, The Netherlands; Cited in ISR.

(Continued)

*Primary Examiner* — James A Fiorito
(74) *Attorney, Agent, or Firm* — Rankin, Hill & Clark LLP

(57) ABSTRACT

A catalyst powder according to the present invention is a catalyst powder that includes: a core portion that contains ceria and zirconia; and a surface layer portion that is located on the core portion and contains ceria and zirconia. The ratio $(M_2/M_1)$ is 0.30 or more and 0.95 or less, the ratio $(M_2/M_1)$ being the ratio of a mole fraction $M_2$ (mol %) of cerium in the surface layer portion measured using X-ray photoelectron spectroscopy to a mole fraction $M_1$ (mol %) of cerium in the entire powder. It is preferable that the ratio $(M_{4/2}/M_{3/1})$ between $M_{3/1}$ and $M_{4/2}$ is 1.1 or more and 5.0 or less, wherein $M_{3/1}$ $(=M_3/M_1)$ represents the ratio between a mole fraction $M_3$ (mol %) of zirconium in the entire powder and a mole fraction $M_1$ (mol %) of cerium in the entirety of the powder, and $M_{4/2}$ $(=M_4/M_2)$ represents the ratio between a mole fraction $M_4$ (mol %) of zirconium measured using X-ray photoelectron spectroscopy and a mole fraction $M_2$ (mol %) of cerium measured using X-ray photoelectron spectroscopy.

8 Claims, No Drawings

(56) References Cited

FOREIGN PATENT DOCUMENTS

| | | |
|---|---|---|
| JP | 2012245452 A | 12/2012 |
| JP | 2014030801 A | 2/2014 |
| JP | 201571520 A | 4/2015 |
| WO | 2012105454 A1 | 8/2012 |
| WO | 2016143722 | 9/2016 |

OTHER PUBLICATIONS

International Search Reported dated Dec. 27, 2016 filed in PCT/JP2016/083804.
Extended European Search Report (EESR) dated May 28, 2019 issued in the corresponding European patent application No. 16866309.4.

* cited by examiner

POWDER FOR CATALYSTS AND CATALYST FOR EXHAUST GAS PURIFICATION

TECHNICAL FIELD

The present invention relates to a catalyst powder that contains ceria and zirconia, and an exhaust gas purification catalyst that contains the catalyst powder.

BACKGROUND ART

Exhaust gas discharged from an internal combustion engine of, for example, an automobile, a motorcycle or the like contains noxious components such as HC, CO, and NOx (nitrogen oxide).

Conventionally, for the purpose of purifying these noxious components so as to convert them into innoxious components, three-way catalysts are used. Some three-way catalysts contain, as a catalyst constituent material, a material that has an oxygen storage capacity (OSC), in order to efficiently purify HC, CO, and NOx by mitigating variations in oxygen concentration in the exhaust gas. As the material that has an OSC, a solid solution of $CeO_2$ and $ZrO_2$ may be used. The solid solution of $CeO_2$ and $ZrO_2$ has an OSC that absorbs and desorbs oxygen in the crystal structure according to the ambient atmosphere.

For example, Patent Literature 1 discloses a carrier for internal combustion engine exhaust gas purification catalysts in which $CeO_2$ is supported on the surface of a core material composed of a $CeO_2$—$ZrO_2$ solid solution. Patent Literature 2 discloses an automobile exhaust gas purification promoter material that includes a core composed of zirconia, and in which ceria-zirconia and ceria are present on the surface of the core, wherein the ceria utilization rate at 800° C. is 91 to 97%. Patent Literature 3 discloses an exhaust gas purification catalyst in which rhodium is supported on a metal oxide particle, wherein the metal oxide particle includes a core portion that contains a relatively large amount of ceria, and an outer shell portion that contains a relatively large amount of zirconia.

CITATION LIST

Patent Literature

Patent Literature 1: US 2014038818 A1
Patent Literature 2: JP 2014-030801 A
Patent Literature 3: US 2007129246 A1

SUMMARY OF INVENTION

Problems to be Solved by the Invention

Exhaust gas regulations have become stricter in recent years. For this reason, there is high demand for an internal combustion engine exhaust gas purification catalyst that purifies noxious components at low to medium temperatures (hereinafter, also referred to as low/medium temperatures) at the initial stage of a startup at which the catalyst is not yet sufficiently warmed up. The carrier for an exhaust gas purification catalyst disclosed in Patent Literature 1 is designed with consideration given to OSC at low/medium temperatures. However, there is still room for improvement in terms of an effective Ce rate at low temperatures, in particular, an effective Ce rate after enduring high temperatures. As used herein, the term "effective Ce rate" refers to the ratio of Ce that can contribute to OSC with respect to the amount of Ce present throughout the entirety of the powder.

On the other hand, Patent Literature 2 discloses that the promoter material has a high effective Ce rate at high temperatures, but the total OSC is low because zirconia is used as the core material, and the core portion does not have OSC. Also, Patent Literature 2 gives no consideration to an effective Ce rate at low/medium temperatures.

Furthermore, the catalyst disclosed in Patent Literature 3 in which the surface is composed of zirconia does not have an OSC in its outer shell portion. Accordingly, the catalyst disclosed in Patent Literature 3 is insufficient in terms of an effective Ce rate at low/medium temperatures.

It is an object of the present invention to provide a catalyst powder that can solve various problems encountered with the conventional techniques described above, and an exhaust gas purification catalyst that contains the catalyst powder.

Means for Solving the Problems

The present inventors found that, surprisingly, the effective Ce rate at low/medium temperatures after enduring high temperatures can be improved significantly by containing $CeO_2$ and $ZrO_2$ in both the core portions and the surface layer portions of (particles of) a catalyst powder, and setting the amount of $CeO_2$ to be smaller in the surface layer portions than in the core portions, and thus accomplished the present invention.

The present invention provides a catalyst powder comprising: a core portion that contains ceria and zirconia; and a surface layer portion that is located on the core portion and that contains ceria and zirconia, wherein a ratio ($M_2/M_1$) is 0.30 or more and 0.95 or less, the ratio ($M_2/M_1$) being a ratio of a mole fraction $M_2$ (mol %) of cerium in the surface layer portion measured using X-ray photoelectron spectroscopy to a mole fraction $M_1$ (mol %) of cerium in the entire powder.

The present invention is to provide an exhaust gas purification catalyst comprising the catalyst powder and a noble metal that is supported on the catalyst powder.

Effects of the Invention

The present invention provides a catalyst powder with which it is possible to produce an exhaust gas purification catalyst that has a high effective Ce rate at low/medium temperatures after enduring high temperatures. With this property, the catalyst powder and the exhaust gas purification catalyst according to the present invention are useful in applications as an exhaust gas purification catalyst for an internal combustion engine of an automobile, a motorcycle, or the like.

DESCRIPTION OF EMBODIMENTS

Hereinafter, the present invention will be described by way of preferred embodiments of the present invention.

The catalyst powder according to the present invention is a catalyst powder that includes: a core portion that contains ceria and zirconia; and a surface layer portion that is located on the core portion and contains ceria and zirconia. As described above, a feature of the catalyst powder according to the present invention is that ceria and zirconia are contained in both the core portion and the surface layer portion. It is preferable that the core portion and the surface layer portion both contain a solid solution of ceria and zirconia, as the ceria. However, a single phase of ceria may be contained as the ceria within the scope in which the effect of the present invention is not impaired. Normally, the surface layer portion is present on the surface of the core portion, and preferably covers the entire surface of the core portion. However, the surface of the core portion may partially have an exposed portion within the scope in which the effect of the present invention is not impaired.

Whether the powder particles have a structure including a core portion and a surface layer portion, and whether the core portions contain ceria and zirconia can be checked using STEM-EDX or the like. Also, whether the powder particles include a surface layer portion that contains ceria and zirconia can be checked using X-ray photoelectron spectroscopy (XPS), or may be checked using STEM-EDX. Isolation of the composition between the core portions and the surface layer portions is difficult. Accordingly, in the present invention, information regarding the powder particle surfaces is obtained through X-ray photoelectron spectroscopic measurement. The fact that the overall composition of the powder and the composition obtained through X-ray photoelectron spectroscopy is different means that the overall composition and the particle surface composition are different, or in other words, it means that a surface (surface layer portion) and a core portion that have different compositions are present. Accordingly, the catalyst powder according to the present invention may be configured such that the composition changes stepwise (discontinuously) from the core of the powder particles to the surface (for example, a configuration in which a core portion and a surface layer portion that have different predetermined compositions are present with an interface therebetween). However, the configuration is not limited thereto, and for example, the catalyst powder according to the present invention may be configured such that the composition changes continuously (gradually) from the core portions to the surface layer portions.

The present inventors conducted in-depth studies on the configuration of a catalyst powder that has a high effective Ce rate at low/medium temperatures after enduring high temperatures, and they found that the efficiency of absorption and desorption of oxygen can be improved significantly at low/medium temperatures after enduring high temperatures by configuring a catalyst powder such that ceria and zirconia are contained in both the core portions and the surface layer portions of the catalyst powder, and the proportion of ceria in the surface layer portions is lower than that in the core portions by a predetermined proportion.

In the catalyst powder according to the present invention that contains ceria and zirconia, the ratio of a mole fraction $M_2$ (mol %) of cerium in the particle surfaces of the catalyst powder measured using X-ray photoelectron spectroscopy to a mole fraction $M_1$ (mol %) of cerium in the entirety of the powder is used as an indicator. In the present invention, the ratio ($M_2/M_1$) of the mole fraction $M_2$ (mol %) of cerium measured using X-ray photoelectron spectroscopy to the mole fraction $M_1$ (mol %) of cerium in the entirety of the powder is 0.30 or more and 0.95 or less.

From the viewpoint of further enhancing the effect of the present invention described above, $M_2/M_1$ is preferably 0.50 or more and 0.90 or less, and more preferably 0.75 or more and 0.90 or less. The measurement of the mole fraction $M_2$ using X-ray photoelectron spectroscopy can be performed as per a method described in an example given below. In the present invention, the mole fraction of a specific metal measured using X-ray photoelectron spectroscopy indicates the proportion of the number of moles of the atoms of the specific metal to "the number of moles of all metal atoms that are present on a powder particle surface measured using X-ray photoelectron spectroscopy". That is, the term "surface layer portion" refers to a surface portion of a powder particle measured using X-ray photoelectron spectroscopy. Also, the term "core portion" refers to a portion that is located on the core side of a particle with respect to the surface layer portion. The mole fraction $M_1$ of cerium in the entirety of the powder can be obtained through calculation based on the composition of raw material at the time of production, or by measuring, using ICP-AES, the amount of cerium in a solution obtained by dissolving the powder through alkaline fusion or the like. The same applies to a mole fraction $M_3$ of zirconium in the entirety of the powder, which will be described later.

The mole fraction $M_2$ of cerium in the surface layer portions measured using X-ray photoelectron spectroscopy is preferably 1.0 mol % or more from the viewpoint of increasing the OSC at low/medium temperatures by containing a predetermined amount of ceria in the powder surface, and is preferably 49.0 mol % or less from the viewpoint of enhancing the effect of the present invention of improving the effective Ce rate after (enduring high temperatures) high thermal endurance. From the viewpoints described above, $M_2$ is preferably 1.0 mol % or more and 40.0 mol % or less, more preferably 3.0 mol % or more and 40.0 mol % or less, and even more preferably 5.0 mol % or more and 30.0 mol % or less.

From the viewpoint of further enhancing the effect of the present invention, the mole fraction $M_1$ of cerium in the entirety of the powder is preferably 3.0 mol % or more and 49.0 mol % or less, and more preferably 10.0 mol % or more and 45.0 mol % or less.

In the catalyst powder according to the present invention, it is preferable that the proportion of zirconia in the surface layer portions is higher than that of ceria, in order to more reliably produce the effect of the present invention of increasing the effective Ce rate at low/medium temperatures after high thermal endurance (enduring high temperatures). As an indication thereof, the ratio $M_{4/2}$ ($=M_4/M_2$) of the mole fraction $M_4$ (mol %) of zirconium in the surface layer portions measured using X-ray photoelectron spectroscopy to the mole fraction $M_2$ of cerium in the surface layer portions measured using X-ray photoelectron spectroscopy is used. To be specific, the ratio $M_{4/2}$ is preferably greater than 1 from the viewpoint of increasing the effective Ce rate at low/medium temperatures after high thermal endurance (enduring high temperatures). Also, the ratio $M_{4/2}$ is preferably 30 or less from the viewpoint of obtaining a catalyst powder with a sufficient OSC. From the viewpoints described above, the ratio $M_{4/2}$ is more preferably 1.1 or more and 20.0 or less, and even more preferably 1.1 or more and 15.0 or less.

In the catalyst powder according to the present invention, the ratio ($M_{4/2}/M_{3/1}$) of $M_{4/2}$ that was described above to $M_{3/1}$ ($=M_3/M_1$) that is the ratio of the mole fraction $M_3$ (mol %) of zirconium in the entirety of the powder to the mole fraction $M_1$ of cerium in the entirety of the powder is preferably 1.1 or more and 5.0 or less. A ratio ($M_{4/2}/M_{3/1}$) of 1.1 or more means that the mole ratio between zirconia and ceria in the powder particle surface is higher than the mole ratio between zirconia and ceria in the entirety of the powder by a predetermined value. Such a catalyst powder is preferable from the viewpoint of further reliably producing the effect of the present invention of increasing the effective Ce rate after thermal endurance. Also, the ratio ($M_{4/2}/M_{3/1}$) is preferably 5.0 or less from the viewpoint of obtaining a catalyst powder that achieves both heat resistance and OSC, as well as from the viewpoint of the effect of the present invention of increasing the effective Ce rate after thermal endurance. From the viewpoints described above, the ratio $(M_{4/2}/M_{3/1})$ is more preferably 1.1 or more and 3.5 or less, even more preferably 1.1 or more and 2.0 or less, and even much more preferably 1.2 or more and 2.0 or less.

From the viewpoint of further enhancing the effect of the present invention, the ratio $M_{3/1}$ $(=M_3/M_1)$ that is the ratio of the mole fraction $M_3$ (mol %) of zirconium in the entirety of the powder to the mole fraction $M_1$ of cerium in the entirety of the powder is preferably 1.0 or more and 20.0 or less, and more preferably 1.0 or more and 10.0 or less.

The mole fraction $M_4$ of zirconium in the surface layer portions measured using X-ray photoelectron spectroscopy is preferably 50.0 mol % or more from the viewpoint of enhancing heat resistance by containing a predetermined amount of zirconia in the powder particle surface, and is preferably 90.0 mol % or less from the viewpoint of obtaining a sufficient OSC provided by ceria. From the viewpoints described above, the mole fraction $M_4$ is more preferably 50.0 mol % or more and 80.0 mol % or less, and even more preferably 55.0 mol % or more and 80.0 mol % or less. The ratio $(M_4/M_3)$ that is the ratio of the mole fraction $M_4$ of zirconium measured using X-ray photoelectron spectroscopy to the mole fraction $M_3$ (mol %) of zirconium in the entirety of the powder is preferably 1.0 or more and 1.9 or less, and more preferably 1.0 or more and 1.7 or less.

From the viewpoint of further enhancing the effect of the present invention, the mole fraction $M_3$ of zirconium in the entirety of the powder is preferably 50.0 mol % or more and 95.0 mol % or less, more preferably 50.0 mol % or more and 90.0 mol % or less, and even more preferably 50.0 mol % or more and 80.0 mol % or less. The mole fraction $M_3$ of zirconium in the entirety of the powder can be obtained using the same method as the method for obtaining the mole fraction $M_1$ of cerium in the entirety of the powder.

The catalyst powder preferably contains a rare earth element oxide excluding ceria and/or an alkaline earth metal oxide. By containing a rare earth element oxide excluding ceria and/or an alkaline earth metal oxide, the effective Ce rate at low/medium temperatures after enduring high temperatures can be improved, and the degree of noble metal dispersion can be increased due to interaction between a noble metal and a carrier. Examples of rare earth elements other than cerium include scandium (Sc), yttrium (Y), lanthanum (La), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). Among these, in particular, by using one or two or more selected from yttrium (Y), lanthanum (La), praseodymium (Pr), and neodymium (Nd), the degree of noble metal dispersion can be increased. Oxides of the above-listed rare earth elements excluding praseodymium (Pr) and terbium (Tb) are sesquioxides $(Ln_2O_3$, where Ln represents a rare earth element). Praseodymium oxide is normally $Pr_6O_{11}$, where x=6, and y=11, and terbium oxide is normally $Tb_4O_7$, where x=4, and y=7. Also, as the alkaline earth metal, strontium (Sr) and/or barium (Ba) is preferably used. Oxides of the rare earth elements and/or the alkaline earth metals may form a solid solution with ceria and/or zirconia, or may not form a solid solution with ceria and/or zirconia. Among these, it is preferable to contain one, two or more selected from yttria $(Y_2O_3)$, lanthanum oxide $(La_2O_3)$, praseodymium oxide $(Pr_6O_{11})$, neodymium oxide $(Nd_2O_3)$, strontium oxide (SrO), and barium oxide (BaO).

The catalyst powder may contain only one of the rare earth element oxides excluding ceria and/or an alkaline earth metal oxide, but it is preferable that the catalyst powder contains two or more from the viewpoint of enhancing the effect of the present invention, and more preferably contains three or more. In doing so, the effects exhibited by respective additional elements such as heat resistance and structural stability are combined, and the effective Ce rate at low/medium temperatures can be further improved. The core portion and the surface layer portion may contain the same rare earth elements other than Ce and/or alkaline earth metal elements, or may contain different rare earth elements other than Ce and/or alkaline earth metal elements. Also, a configuration designed such that a rare earth element oxide(s) other than ceria that can improve the degree of noble metal dispersion and an alkaline earth metal oxide(s) that suppresses sintering of noble metals at high temperatures is preferable from the viewpoint of further improving the degree of noble metal dispersion.

The amount of the rare earth element oxide(s) excluding ceria and/or the alkaline earth metal oxide(s) is preferably 1 part by mass or more and 20 parts by mass or less relative to 100 parts by mass of the entirety of the powder. It is preferable to set the amount of the rare earth element oxide(s) excluding ceria and/or the alkaline earth metal oxide(s) to 1 part by mass or more from the viewpoint of further enhancing the above-described effect obtained from the rare earth element oxide(s). It is also preferable to set the amount of the rare earth element oxide(s) excluding ceria and/or the alkaline earth metal oxide(s) to 20 parts by mass or less from the viewpoint of enhancing the effect of improving OSC while ensuring the amount of ceria. From the viewpoints described above, the amount of the rare earth element oxide(s) excluding ceria is more preferably 2 parts by mass or more and 20 parts by mass or less relative to 100 parts by mass of the entirety of the powder, and even more preferably 4 parts by mass or more and 20 parts by mass or less. In particular, from the viewpoint of improving the degree of noble metal dispersion, the amount of the rare earth element oxide(s) excluding ceria and/or the alkaline earth metal oxide(s) is preferably 5 parts by mass or more relative to 100 parts by mass of the entirety of the powder. The amount of the rare earth element oxide(s) excluding ceria and/or the alkaline earth metal oxide(s) in the powder can be obtained by measuring, using ICP-AES, the amount of the rare earth element(s) excluding cerium and/or the alkaline earth metal element(s) in a solution obtained by dissolving the powder through alkaline fusion or the like, as with the mole fraction $M_1$ of cerium in the entirety of the powder. As used herein, "the amount of the rare earth element oxide(s) excluding ceria and/or the alkaline earth metal oxide(s)" refers to the amount of the rare earth element oxide(s) excluding ceria or the alkaline earth metal oxide(s) that is contained in the powder in the case where the powder contains either the rare earth element oxide(s) excluding ceria or the alkaline earth metal oxide(s), or the total amount of the rare earth element oxide(s) excluding ceria and the alkaline earth metal oxide(s) that are contained in the powder in the case where the powder contains both the rare earth element oxide(s) excluding ceria and the alkaline earth metal oxide(s).

From the viewpoint of improving the degree of noble metal dispersion, a mole fraction $M_5$ of the rare earth element other than cerium and/or the alkaline earth metal element in the surface layer portions measured using X-ray photoelectron spectroscopy is preferably 1.0 mol % or more, more preferably 5.0 mol % or more, and even more preferably 10.0 mol % or more. The mole fraction $M_5$ is preferably 50.0 mol % or less, particularly, 40.0 mol % or less, and more particularly 20.0 mol % or less from the viewpoint of more reliably obtaining the effect of the present invention while ensuring a predetermined amount of ceria and zirconia in the powder. Also, the ratio ($M_5/M_6$) that is the ratio of the mole fraction $M_5$ of the rare earth element other than cerium and/or the alkaline earth metal element in the surface layer portions measured using X-ray photoelectron spectroscopy to the mole fraction $M_6$ of the rare earth element other than cerium and/or the alkaline earth metal element in the entirety of the powder is preferably 0.5 or more and 10.0 or less, and more preferably 1.0 or more and 5.0 or less. As used herein, "the mole fraction of the rare earth element other than cerium and/or the alkaline earth metal element" refers to the mole fraction of the rare earth element other than cerium or the alkaline earth metal element contained in the powder in the case where the powder contains either one of the rare earth element other than cerium and the alkaline earth metal element, or the total mole fraction of the rare earth element other than cerium and the alkaline earth metal element that are contained in the powder in the case where the powder contains both the rare earth element other than cerium and the alkaline earth metal element.

Also, from the viewpoint of improving the degree of noble metal dispersion, the ratio ($M_5/M_2$) that is the ratio of the mole fraction $M_5$ of the rare earth element other than cerium and/or the alkaline earth metal element in the surface layer portions measured using X-ray photoelectron spectroscopy to the mole fraction $M_2$ of cerium in the surface layer portions measured using X-ray photoelectron spectroscopy is preferably 0.1 or more and 8.0 or less, and more preferably 0.3 or more and 3.0 or less.

Normally, the catalyst powder according to the present invention contains core particles that contains ceria and zirconia, and a supported metal oxide that is supported on the surface of the core particles. With this configuration, in the catalyst powder according to the present invention, the surface layer portions can be easily formed so as to satisfy the ratio $M_2/M_1$ described above. The supported metal oxide may contain ceria and/or zirconia, or may not contain ceria and/or zirconia. For example, in the case where the amount of supported metal oxide is sufficiently small, even if the supported metal oxide does not contain ceria and/or zirconia, because the core particles contain ceria and zirconia, it is possible to cause the surface layers portion to contain ceria and zirconia, and the above-described ratio $M_2/M_1$ can be satisfied. However, from the viewpoint of obtaining a high effective Ce rate, it is preferable that the supported metal oxide contains ceria and zirconia. Whether or not a supported metal oxide that contains ceria and zirconia is supported on the core particles that contain ceria and zirconia in the catalyst powder can be observed using STEM-EDX. For example, as a result of EDX line analysis of a particle cross-section, if variation is observed in zirconia and ceria peaks in an area spanning from the surface side to the core side of a particle, specifically, for example, a small ceria peak is observed at an end portion and a large ceria peak is observed in the inner portion, it can be said that ceria and zirconia are supported on a core particle that contains ceria and zirconia. The core portion of the present invention constitutes at least a portion of the core particle. The core portion may be composed only of a core particle, or may partially contain a supported metal oxide. Also, the surface layer portion of the present invention constitutes at least a portion of the supported metal oxide. The supported metal oxide may be composed only of a supported metal oxide, or may partially contain a core particle. Examples of supported metal oxides other than ceria and zirconia include oxides of rare earth elements other than Ce and/or alkaline earth metals. As the rare earth elements other than Ce and the alkaline earth metals, those listed above can be used.

The catalyst powder according to the present invention preferably has an average particle size ($D_{50}$) of 100 μm or less from the viewpoint of preparing a catalyst. Also, the catalyst powder preferably has an average particle size ($D_{50}$) of 1 μm or more from the viewpoint of preparing a catalyst. From the viewpoints described above, the catalyst powder preferably has an average particle size ($D_{50}$) of 1 μm or more and 100 μm or less, and more preferably 2 μm or more and 50 μm or less. The average particle size ($D_{50}$) of the catalyst powder refers to the volume cumulative 50% particle size obtained using a laser diffraction scattering particle size distribution measurement method, and is measured using, for example, Microtrac MT 3300 II available from Nikkiso Co., Ltd. or Microtrac Inc. after introducing a sample (in the form of powder) into a water-soluble solvent using an auto sample feeding machine (Microtrac SDC available from Nikkiso Co., Ltd.) for a laser diffraction particle size distribution measurement apparatus, and applying 40 W ultrasonic waves to the sample for 360 seconds at a flow rate of 40%. The measurement conditions are as follows:

particle refractive index: 1.5;
particle shape: true spherical shape;
solvent refractive index: 1.3;
set zero: 30 seconds; and
measurement time: 30 seconds.
Measurement is performed twice and an average value is obtained.

The catalyst powder according to the present invention is preferably used to form an exhaust gas purification catalyst by supporting a noble metal on the catalyst powder. Examples of the noble metal include palladium (Pd), platinum (Pt), rhodium (Rh), and the like. The amount of noble metal supported on the catalyst powder is preferably 0.1 parts by mass or more and 20 parts by mass or less relative to 100 parts by mass of a total amount of the catalyst powder and the noble metal, and more preferably 1 part by mass or more and 10 parts by mass or less. The amount of noble metal supported on the catalyst powder can be obtained by measuring, using ICP-AES, the amount of noble metal in a solution obtained by dissolving the catalyst through alkaline fusion or the like, as with the mole fraction $M_1$ of cerium in the entirety of the powder.

The catalyst powder according to the present invention is preferably produced using, for example, the following production method.

A production method according to the present invention includes:

a first step of adjusting the pH of an aqueous solution that contains a water-soluble cerium salt and a water-soluble zirconium salt to 9.0 or more and 14.0 or less so as to obtain a first precipitate and calcining the first precipitate so as to form a core material; and a second step of adjusting the pH of a dispersion that contains the core material produced in the first step and water-soluble salts of the supported metals described above to 9.0 or more and 14.0 or less so as to obtain a second precipitate and calcining the second precipitate. Preferred examples of the water-soluble salts of the supported metals include a water-soluble cerium salt and a water-soluble zirconium salt.

As the water-soluble cerium salt, a compound that can be converted into $CeO_2$ through calcining such as, for example, cerium nitrate or the like can be used. As the water-soluble zirconium salt, a compound that can be converted into $ZrO_2$ through calcining such as, for example, zirconium oxynitrate or the like can be used. For adjusting the pH to obtain the first precipitate and the second precipitate, it is preferable to use an alkaline agent such as ammonium carbonate or sodium hydroxide. The first precipitate can be calcined in an ambient atmosphere at a temperature of, for example, 600° C. or more and 1000° C. or less for 1 hour or more and 24 hours or less. Likewise, the second precipitate can be calcined in an ambient atmosphere at a temperature of, for example, 600° C. or more and 1000° C. or less for 1 hour or more and 24 hours or less.

In the case where the rare earth element oxide other than ceria and/or the alkaline earth metal oxide is contained in the catalyst powder, water-soluble salts of rare earth elements other than Ce and/or alkaline earth metals are contained in an aqueous solution that contains a water-soluble Ce salt and a Zr salt in the first step and/or in a dispersion that contains water-soluble salts of supported metals and a core material in the second step. In the case where cerium and zirconium are not used as supported metals, rare earth elements other than Ce and/or alkaline earth metals may be exclusively used as water-soluble salts in the dispersion.

The amount of cerium salt in the first step is preferably adjusted to be 5 mass % or more and 58 mass % or less when calculated as ceria, based on the mass of oxides converted from all metal salts contained in the aqueous solution, and more preferably 20 mass % or more and 58 mass % or less. The amount of zirconium salt in the first step is preferably adjusted to be 42 mass % or more and 95 mass % or less when calculated as zirconia, based on the mass of oxides converted from all metal salts contained in the aqueous solution, and more preferably 42 mass % or more and 80 mass % or less. The amount of salt of the rare earth element other than cerium is preferably adjusted to be 1 mass % or more and 20 mass % or less when calculated as a rare earth element oxide, based on the mass of oxides converted from all metal salts contained in the aqueous solution.

The amount of cerium salt used in the second step is preferably adjusted to be 5 mass % or more and 58 mass % or less when calculated as ceria, based on the mass of metal oxides other than the core material produced when all water-soluble metal salts contained in the dispersion before pH adjustment are converted into oxides, and to be less than the amount of cerium salt in the first step. The amount of zirconium salt in the second step is preferably adjusted to be 42 mass % or more and 95 mass % or less when calculated as zirconia, based on the mass of metal oxides other than the core material produced when all water-soluble metal salts contained in the dispersion before pH adjustment are converted into oxides. The amount of salt of the rare earth element other than cerium is preferably adjusted to be 1 mass % or more and 35 mass % or less when calculated as a rare earth element oxide, based on the mass of metal oxides other than the core material produced when all water-soluble metal salts contained in the dispersion before pH adjustment are converted into oxides.

The quantitative ratio between the water-soluble metal salt and the core material in the dispersion in the second step is the ratio between the oxide equivalent mass of all water-soluble metals in the dispersion (that correspond to the mass of non-supported metal oxides, and may correspond to the mass of the surface layer portion) and the mass of the core material, and the ratio between the former and the latter is preferably 1:0.2 or more and 99 or less, and more preferably 1:1 or more and 20 or less.

In order to cause a noble metal to be supported on the catalyst powder particles, it is preferable to immerse the catalyst powder in a noble metal-containing solution, and thereafter dry and calcine the catalyst powder. As the noble metal salt used to prepare the noble metal solution, for example, a nitric salt, an amine complex salt, a chloride, or the like can be used. As the solvent, water or the like can be used. Calcining is preferably performed in an ambient atmosphere at a temperature of 400° C. or more and 800° C. or less for 1 hour or more and 24 hours or less. The calcining temperature may be different between the first step and the second step within the range described above. It is possible to, for example, set the calcining temperature in the first step to be higher than the calcining temperature in the second step. With this configuration, the noble metal dispersibility at the initial stage of purification of the exhaust gas purification catalyst can be improved.

The exhaust gas purification catalyst in which the noble metal is supported on the catalyst powder particles in the manner described above exhibits a stable OSC even when exposed to a high temperature of about 800° C. or more and 1100° C. or less, and in particular, exhibits a high effective Ce rate at a low/medium temperature such as, for example, 400° C. that is the start temperature of an engine of an automobile, or 600° C. that is the temperature when a high-speed steady operation is started after acceleration of the engine. The exhaust gas purification catalyst can exhibit a high level of exhaust gas purification performance in a stable manner as a catalyst for purifying the exhaust gas of an internal combustion engine that uses fossil fuel as a power source such as a gasoline engine or a diesel engine.

EXAMPLES

Hereinafter, the present invention will be described in further detail by way of examples. However, the scope of the present invention is not limited to the examples given below. Unless otherwise stated, "%" means "mass %".

Comparative Example 1 (First Step)

To an aqueous solution acting as a raw material that contained cerium nitrate, zirconium oxynitrate, lanthanum nitrate, and neodymium nitrate at a ratio such that the composition shown in Table 1 given below was obtained when they were converted into oxides, sodium hydroxide was added as a precipitator in an amount such that the aqueous solution had a pH of 12.0. The resulting precipitate was filtered, and the filtrate was washed and sufficiently dried. After that, the resulting product was calcined in an ambient atmosphere of 800° C. for 3 hours, and a catalyst powder of Comparative Example 1 was thereby obtained.

Example 1 (Second Step)

A dispersion was prepared by adding the powder obtained in Comparative Example 1 to an aqueous solution as a raw material that contained cerium nitrate, zirconium oxynitrate, lanthanum nitrate, and neodymium nitrate at a ratio such that the composition shown in Table 1 (supported metal oxide columns) was obtained when they were converted into oxides. Sodium hydroxide was added to the dispersion as a precipitator in an amount such that the dispersion had a pH of 12.0. The resulting precipitate was filtered, and the filtrate was washed and sufficiently dried. After that, the resultant was calcined at 800° C. for 3 hours, and a catalyst powder of Example 1 was thereby obtained. Here, the quantitative ratio between the powder of Comparative Example 1 and the nitric salts contained in the aqueous solution in the second step was adjusted such that the mass ratio between the powder and oxides derived from the nitric salts was as shown in the column "Core particle: Supported metal oxide" in Table 1.

Examples 2 to 9, and Comparative Example 2

The amounts of cerium nitrate, zirconium oxynitrate, lanthanum nitrate, and neodymium nitrate in the raw material in Example 1 were changed to a ratio such that the compositions shown in Table 1 (supported metal oxide items) were obtained, and the quantitative ratio between the powder of Comparative Example 1 and the nitric salts contained in the aqueous solution in the second step was adjusted such that the mass ratio between the powder and oxides derived from the nitric salts was as shown in the items "Core particle: Supported metal oxide" in Table 1. Catalyst powders were obtained in the same manner as in Example 1 except for the above-described points. Note that in Example 7, praseodymium nitrate was used in the dispersion in the second step in addition to the nitric salts at a ratio such that the composition shown in Table 1 was obtained when they were converted into oxides, and in Example 8, yttrium nitrate was used in the dispersion in the second step in addition to the nitric salts at a ratio such that the composition shown in Table 1 was obtained when they were converted into oxides.

Comparative Example 3

A dispersion used in the second step was prepared by adding the powder obtained in Comparative Example 1 to an aqueous solution that contained only zirconium oxynitrate as a water-soluble metal salt. The quantitative ratio between the powder of Comparative Example 1 and the nitric salt contained in the aqueous solution in the second step was adjusted such that the mass ratio between the powder and an oxide derived from the nitric salt was as shown in the item "Core particle: Supported metal oxide" in Table 1. After that, sodium hydroxide was added to the dispersion as a precipitator in an amount such that the dispersion had a pH of 12.0. A catalyst powder was obtained in the same manner as in Example 1 except for the above-described points.

Comparative Example 4

A dispersion used in the second step was prepared by adding the powder obtained in Comparative Example 1 to an aqueous solution that contained only praseodymium nitrate as a water-soluble metal salt. The quantitative ratio between the powder of Comparative Example 1 and the nitric salt contained in the aqueous solution in the second step was adjusted such that the mass ratio between the powder and an oxide derived from the nitric salt was as shown in the item "Core particle: Supported metal oxide" in Table 1. After that, hydroxide was added to the dispersion as a precipitator in an amount such that the dispersion had a pH of 12.0. A catalyst powder was obtained in the same manner as in Example 1 except for the above-described points.

Comparative Example 5 (First Step)

An aqueous solution was prepared as a raw material that contained cerium nitrate and zirconium oxynitrate at a ratio such that the composition shown in Table 1 was obtained when they were converted into oxides. Sodium hydroxide was added to the aqueous solution as a precipitator in an amount such that the aqueous solution had a pH of 12.0. The resulting precipitate was filtered, and the filtrate was washed and sufficiently dried. After that, the resultant was calcined at 800° C. for 3 hours, and a catalyst powder was thereby obtained.

Example 10 (Second Step)

A dispersion was prepared by adding the catalyst powder of Comparative Example 5 to an aqueous solution as a raw material that contained cerium nitrate and zirconium oxynitrate at a ratio such that the composition shown in Table 1 (supported metal oxide item) was obtained when they were converted into oxides. The quantitative ratio between the powder of Comparative Example 5 and the nitric salts contained in the aqueous solution in the second step was adjusted such that the mass ratio between the powder and oxides derived from the nitric salts was as shown in the column "Core particle: Supported metal oxide" in Table 1. After that, sodium hydroxide was added to the dispersion as a precipitator in an amount such that the dispersion had a pH of 12.0. The resulting precipitate was filtered, and the filtrate was washed and sufficiently dried. After that, the resultant was calcined at 800° C. for 3 hours, and a catalyst powder of Example 10 was thereby obtained.

Comparative Example 6

A dispersion used in the second step was prepared by adding the powder obtained in Comparative Example 1 to an aqueous solution that contained only cerium nitrate as a water-soluble metal salt. The quantitative ratio between the powder of Comparative Example 1 and the nitric salt contained in the aqueous solution in the second step was adjusted such that the mass ratio between the powder and an oxide derived from the nitric salt was as shown in the item "Core particle: Supported metal oxide" in Table 1. After that, sodium hydroxide was added to the dispersion as a precipitator in an amount such that the dispersion had a pH of 12.0. A catalyst powder was obtained in the same manner as in Example 1 except for the above-described points.

Examples 11 to 14

The amounts of cerium nitrate, zirconium oxynitrate, lanthanum nitrate, and neodymium nitrate, as well as praseodymium nitrate, yttrium nitrate and/or strontium nitrate in the raw material in Example 1 were changed to a ratio such that the compositions shown in Table 1 (supported metal oxide items) were obtained, and the quantitative ratio between the powder of Comparative Example 1 and the nitric salts contained in the aqueous solution in the second step was adjusted such that the mass ratios between the powder and oxides derived from the nitric salts were as shown in the items "Core particle: Supported metal oxide" in Table 1. Catalyst powders were obtained in the same manner as in Example 1 except for the above-described points.

Example 15

The amounts of yttrium nitrate and strontium nitrate in the raw material in Example 1 were changed to a ratio such that the composition shown in Table 1 (supported metal oxide item) was obtained, and the quantitative ratio between the powder of Comparative Example 1 and the nitric salts contained in the aqueous solution in the second step was adjusted such that the mass ratio between the powder and oxides derived from the nitric salts was as shown in the item "Core particle: Supported metal oxide" in Table 1. A catalyst powder was obtained in the same manner as in Example 1 except for the above-described points.

TABLE 1

| | | Core particle: Supported metal oxide (mass ratio) | Composition (mass %) | | | | | | |
|---|---|---|---|---|---|---|---|---|---|
| | Structure | | CeO2 | ZrO2 | La2O3 | Nd2O3 | Pr6O11 | Y2O3 | SrO |
| Comp. Ex. 1 | Uniform | — | 40.0 | 50.0 | 5.0 | 5.0 | — | — | — |
| Ex. 1 | Core particle | 19:1 | 40.0 | 50.0 | 5.0 | 5.0 | — | — | — |
| | Supported metal oxide | | 25.0 | 65.0 | 5.0 | 5.0 | — | — | — |
| Ex. 2 | Core particle | 4:1 | 40.0 | 50.0 | 5.0 | 5.0 | — | — | — |
| | Supported metal oxide | | 10.0 | 80.0 | 5.0 | 5.0 | — | — | — |
| Ex. 3 | Core particle | 4:1 | 40.0 | 50.0 | 5.0 | 5.0 | — | — | — |
| | Supported metal oxide | | 25.0 | 65.0 | 5.0 | 5.0 | — | — | — |
| Comp. Ex. 2 | Core particle | 4:1 | 40.0 | 50.0 | 5.0 | 5.0 | — | — | — |
| | Supported metal oxide | | 60.0 | 30.0 | 5.0 | 5.0 | — | — | — |
| Ex. 4 | Core particle | 1:1 | 40.0 | 50.0 | 5.0 | 5.0 | — | — | — |
| | Supported metal oxide | | 25.0 | 65.0 | 5.0 | 5.0 | — | — | — |
| Ex. 5 | Core particle | 4:1 | 40.0 | 50.0 | 5.0 | 5.0 | — | — | — |
| | Supported metal oxide | | 20.0 | 55.0 | 20.0 | 5.0 | — | — | — |
| Ex. 6 | Core particle | 4:1 | 40.0 | 50.0 | 5.0 | 5.0 | — | — | — |
| | Supported metal oxide | | 20.0 | 55.0 | 5.0 | 20.0 | — | — | — |
| Ex. 7 | Core particle | 4:1 | 40.0 | 50.0 | 5.0 | 5.0 | — | — | — |
| | Supported metal oxide | | 5.0 | 65.0 | 5.0 | 5.0 | 20.0 | — | — |
| Ex. 8 | Core particle | 4:1 | 40.0 | 50.0 | 5.0 | 5.0 | — | — | — |
| | Supported metal oxide | | 20.0 | 50.0 | 5.0 | 5.0 | — | 20.0 | — |
| Ex. 9 | Core particle | 1:1 | 40.0 | 50.0 | 5.0 | 5.0 | — | — | — |
| | Supported metal oxide | | 5.0 | 85.0 | 5.0 | 5.0 | — | — | — |
| Comp. Ex. 3 | Core particle | 4:1 | 40.0 | 50.0 | 5.0 | 5.0 | — | — | — |
| | Supported metal oxide | | — | 100.0 | — | — | — | — | — |
| Comp. Ex. 4 | Core particle | 4:1 | 40.0 | 50.0 | 5.0 | 5.0 | — | — | — |
| | Supported metal oxide | | — | — | — | — | 100.0 | — | — |
| Comp. Ex. 5 | Uniform | — | 40.0 | 60.0 | — | — | — | — | — |
| Ex. 10 | Core particle | 4:1 | 40.0 | 60.0 | — | — | — | — | — |
| | Supported metal oxide | | 25.0 | 75.0 | — | — | — | — | — |
| Comp. Ex. 6 | Core particle | 4:1 | 40.0 | 50.0 | 5.0 | 5.0 | — | — | — |
| | Supported metal oxide | | 100.0 | — | — | — | — | — | — |
| Ex. 11 | Core particle | 4:1 | 40.0 | 50.0 | 5.0 | 5.0 | — | — | — |
| | Supported metal oxide | | 20.0 | 50.0 | 5.0 | 5.0 | 10.0 | 5.0 | 5.0 |
| Ex. 12 | Core particle | 4:1 | 40.0 | 50.0 | 5.0 | 5.0 | — | — | — |
| | Supported metal oxide | | 20.0 | 50.0 | 5.0 | 5.0 | 15.0 | — | 5.0 |
| Ex. 13 | Core particle | 4:1 | 40.0 | 50.0 | 5.0 | 5.0 | — | — | — |
| | Supported metal oxide | | 20.0 | 50.0 | 5.0 | 5.0 | — | 15.0 | 5.0 |
| Ex. 14 | Core particle | 4:1 | 40.0 | 50.0 | 5.0 | 5.0 | — | — | — |
| | Supported metal oxide | | 20.0 | 50.0 | 5.0 | 5.0 | 10.0 | 10.0 | — |
| Ex. 15 | Core particle | 98:2 | 40.0 | 44.0 | 5.0 | 5.0 | 5.0 | — | — |
| | Supported metal oxide | | — | — | — | — | — | 1.0 | 0.5 |

For each of the catalyst powders of Examples 1 to 15 and Comparative Examples 1 to 6, the mole fraction $M_2$ of cerium in the surface layer portions and the mole fraction $M_4$ (mol %) of zirconium in the surface layer portions were obtained through X-ray photoelectron spectroscopy performed under the following conditions. Also, the mole fraction $M_1$ (mol %) of cerium in the entirety of the powder and the mole fraction $M_3$ of zirconium in the entirety of the powder (mol %) were obtained based on the amount of raw material. Also, the mole fraction $M_5$ of the rare earth element other than ceria and/or the alkaline earth metal element in the surface layer portions, and the mole fraction $M_6$ of the rare earth element other than ceria and/or the alkaline earth metal element in the entirety of the powder were obtained, and $M_5/M_2$ and $M_5/M_6$ were calculated. The obtained $M_1$, $M_2$, $M_3$, $M_4$, $M_2/M_1$ ($M_{2/1}$), $M_3/M_1$ ($M_{3/1}$), $M_4/M_2$ ($M_{4/2}$), $M_{4/2}/M_{3/1}$, $M_4/M_3$ ($M_{4/3}$), $M_5$, $M_6$, $M_5/M_2$ ($M_{5/2}$), and $M_5/M_6$ ($M_{5/6}$) are shown in Table 2 given below.

As a result of XPS analysis, it was confirmed that the oxides present in the surface layer portions of the powder obtained in each of the examples were the same as shown in the non-supported metal oxide items in Table 1. Also, as a result of STEM-EDX analysis, it was confirmed that the oxides present in the core portions of the powder obtained in each of the examples were the same as shown in the core particle items in Table 1.

Measurement Conditions for X-Ray Photoelectron Spectroscopy

As an X-ray photoelectron spectroscopy analyzer, XPS Quantam 2000 available from Ulvac-Phi, Inc. was used. As the X-ray source, AlKα1 rays (1486.8 eV) were used. An X-ray irradiated area was set to 200 μmφ, the path energy was set to 23.5 eV, the angle between sample and detector was set to 15°, the measurement depth was set to several nm, the measurement interval was set to 0.1 eV, the tube voltage was set to 15 kV, and the tube current was set to 2.67 mA. The number of scans was 10 for each element. Also, MultiPak Ver. 6.1A available from Ulvac-Phi, Inc. was used for data analysis.

TABLE 2

| | Powder Ce M1 | Surface layer portion Ce M2 | Powder Zr M3 | Surface layer portion Zr M4 | $M_{2/1}$ | $M_{3/1}$ | $M_{4/2}$ | $M_{4/2}/M_{3/1}$ | $M_{4/3}$ | Amount of rare earth element oxide other than CeO2 and/or alkaline earth metal oxide (relative to powder, mass %) | $M_5$ | $M_6$ | $M_{5/2}$ | $M_{5/6}$ |
|---|---|---|---|---|---|---|---|---|---|---|---|---|---|---|
| Comp. Ex 1 | 33.3 | 33.7 | 58.1 | 55.7 | 1.01 | 1.75 | 1.65 | 0.95 | 0.96 | 10.0 | 10.60 | 8.65 | 0.31 | 1.23 |
| Ex. 1 | 32.6 | 24.4 | 58.8 | 63.4 | 0.75 | 1.81 | 2.60 | 1.44 | 1.08 | 10.0 | 12.18 | 8.63 | 0.50 | 1.41 |
| Ex. 2 | 27.7 | 19.5 | 63.8 | 65.4 | 0.70 | 2.29 | 3.35 | 1.46 | 1.03 | 10.0 | 15.10 | 8.48 | 0.77 | 1.78 |
| Ex. 3 | 30.5 | 25.9 | 61.0 | 65.2 | 0.85 | 2.00 | 2.52 | 1.26 | 1.07 | 10.0 | 8.90 | 8.56 | 0.34 | 1.04 |
| Comp. Ex 2 | 37.1 | 43.0 | 54.2 | 40.2 | 1.16 | 1.46 | 0.93 | 0.64 | 0.74 | 10.0 | 16.78 | 8.76 | 0.39 | 1.92 |
| Ex. 4 | 26.4 | 23.5 | 65.2 | 68.1 | 0.89 | 2.47 | 2.90 | 1.17 | 1.04 | 10.0 | 8.42 | 8.44 | 0.36 | 1.00 |
| Ex. 5 | 29.8 | 24.4 | 59.0 | 61.0 | 0.82 | 1.98 | 2.50 | 1.26 | 1.03 | 13.0 | 14.56 | 11.23 | 0.60 | 1.30 |
| Ex. 6 | 29.8 | 24.2 | 59.0 | 61.2 | 0.81 | 1.98 | 2.53 | 1.28 | 1.04 | 13.0 | 14.64 | 11.16 | 0.61 | 1.31 |
| Ex. 7 | 27.2 | 20.5 | 60.9 | 65.5 | 0.76 | 2.23 | 3.30 | 1.48 | 1.07 | 14.0 | 14.00 | 11.89 | 0.68 | 1.18 |
| Ex. 8 | 29.4 | 24.1 | 57.1 | 61.2 | 0.82 | 1.94 | 2.54 | 1.31 | 1.07 | 14.0 | 14.67 | 13.48 | 0.61 | 1.09 |
| Ex. 9 | 17.7 | 6.0 | 74.1 | 79.5 | 0.34 | 4.19 | 13.22 | 3.15 | 1.07 | 10.0 | 14.48 | 8.18 | 2.41 | 1.77 |
| Comp. Ex 3 | 25.8 | 6.2 | 67.5 | 91.0 | 0.24 | 2.62 | 14.71 | 5.62 | 1.35 | 8.0 | 2.81 | 6.70 | 0.45 | 0.42 |
| Comp. Ex 4 | 27.5 | 6.3 | 48.0 | 35.0 | 0.23 | 1.75 | 5.54 | 3.17 | 0.73 | 28.0 | 58.68 | 24.52 | 9.28 | 2.39 |
| Comp. Ex 5 | 32.3 | 33.3 | 67.7 | 66.7 | 1.03 | 2.10 | 2.01 | 0.96 | 0.99 | 0.0 | 0.00 | 0.00 | 0.00 | — |
| Ex. 10 | 29.6 | 25.5 | 70.4 | 74.5 | 0.86 | 2.38 | 2.93 | 1.23 | 1.06 | 0.0 | 0.00 | 0.00 | 0.00 | — |
| Comp. Ex 6 | 44.8 | 67.1 | 48.1 | 27.0 | 1.50 | 1.07 | 0.40 | 0.37 | 0.56 | 8.0 | 5.87 | 7.16 | 0.09 | 0.82 |
| Ex. 11 | 29.6 | 24.0 | 57.5 | 60.9 | 0.81 | 1.94 | 2.54 | 1.31 | 1.06 | 13.0 | 14.68 | 11.48 | 0.61 | 1.28 |
| Ex. 12 | 29.8 | 23.9 | 57.8 | 61.0 | 0.80 | 1.94 | 2.55 | 1.32 | 1.06 | 13.0 | 14.55 | 11.11 | 0.61 | 1.31 |
| Ex. 13 | 29.4 | 24.2 | 57.0 | 60.9 | 0.82 | 1.94 | 2.52 | 1.30 | 1.07 | 13.0 | 14.62 | 12.22 | 0.60 | 1.20 |
| Ex. 14 | 29.7 | 24.1 | 57.6 | 61.3 | 0.81 | 1.94 | 2.54 | 1.31 | 1.06 | 14.0 | 14.60 | 12.75 | 0.61 | 1.14 |
| Ex. 15 | 38.2 | 31.1 | 57.4 | 63.4 | 0.8 | 1.5 | 2.0 | 1.4 | 1.1 | 11.2 | 3.2 | 4.0 | 0.1 | 0.8 |

Each of the catalyst powders of Examples 1 to 15 and Comparative Examples 1 to 6 was immersed in an aqueous solution of palladium (II) nitrate at a quantitative ratio at which the concentration of supported palladium calculated as the mass of palladium metal was 1.0 mass %, based on the total amount of the catalyst powder and the palladium metal. After that, the catalyst powder was evaporated and dried, and then calcined in an ambient atmosphere of 600° C. for 3 hours, whereby a catalyst powder, which was a Pd-supported $CeO_2$—$ZrO_2$ composite oxide, was obtained.

The obtained catalyst powder was subjected to endurance calcining at 950° C. in atmospheric air for 24 hours, and thereafter subjected to the following evaluations.

Evaluation

Measurement of Effective Ce Rate (%)

The OSC of each catalyst powder was measured using a CO pulse method. The effective Ce rate was indicated as the proportion of OSC in the catalyst powder, with the amount of OSC (μmol-O2) when all of Ce contained in the catalyst powder was converted from $Ce^{4+}$ to $Ce^{3+}$ taken as 100%. The results are shown in Table 3.

Measurement of Pd Dispersivity (%)

Pd dispersivity was calculated from the CO adsorption amount measured using a CO pulse method based on the assumption that Pd contained in the catalyst was adsorbed to CO at a proportion of 1:1. The results are shown in Table 4.

TABLE 3

| Effective Ce (%) | 400° C. | 600° C. |
|---|---|---|
| Example 4 | 59.1 | 66.0 |
| Example 7 | 57.9 | 64.2 |
| Example 5 | 56.1 | 61.5 |
| Example 2 | 55.3 | 61.9 |
| Example 12 | 55.2 | 62.1 |
| Example 1 | 54.9 | 60.0 |
| Example 3 | 54.6 | 61.8 |
| Example 14 | 54.4 | 60.1 |
| Example 11 | 54.3 | 60.8 |
| Example 13 | 54.2 | 60.3 |

TABLE 3-continued

| Effective Ce (%) | 400° C. | 600° C. |
|---|---|---|
| Example 6 | 53.4 | 61.4 |
| Example 8 | 53.1 | 59.6 |
| Example 9 | 53.0 | 59.4 |
| Example 10 | 51.5 | 58.5 |
| Example 15 | 51.1 | 57.8 |
| Comparative Example 1 | 50.4 | 57.0 |
| Comparative Example 3 | 48.0 | 52.0 |
| Comparative Example 2 | 46.1 | 50.8 |
| Comparative Example 5 | 44.5 | 48.2 |
| Comparative Example 4 | 40.8 | 50.6 |
| Comparative Example 6 | 30.5 | 42.1 |

As compared with Comparative Example 1 in which the powder had a uniform structure and $M_{2/1}$ was close to 1, Comparative Examples 2 and 6 in which the amount of ceria in the surface layer portions was larger and $M_{2/1}$ was greater than that of the present invention, and Comparative Examples 3 and 4 in which the oxide contained on the surface side to be supported on the core material did not contain ceria and $M_{2/1}$ was less than that of the present invention, the catalysts of the examples exhibited a high effective Ce rate at 400 to 600° C. Also, even in the case where a rare earth element other than Ce was not contained, Example 10 exhibited a higher effective Ce rate than Comparative Example 5 in which the powder had a uniform structure. From these results, it can be seen that in the catalysts of the examples, absorption and desorption of oxygen takes place more efficiently at low/medium temperatures after enduring high temperatures than in the catalysts of Comparative Examples 1 to 6. Also, as in Examples 1 to 10, with the catalysts of Examples 1 to 9, and 11 to 15 that contained rare earth elements other than Ce, the effective Ce rate was improved as compared with the catalyst of Example 10 that did not contain a rare earth element.

As described above, it is clear that the catalyst powder of the present invention and a catalyst obtained by supporting a noble metal on the catalyst powder of the present invention exhibit an excellent effect in the purification of exhaust gas in an internal combustion engine, in particular, the purification of exhaust gas generated at low/medium temperatures.

TABLE 4

|  | Pd dispersivity (%) |
|---|---|
| Comparative Example 1 | 9.0 |
| Example 1 | 9.2 |
| Example 2 | 9.3 |
| Example 3 | 9.1 |
| Comparative Example 2 | 8.9 |
| Example 4 | 9.2 |
| Example 5 | 10.4 |
| Example 6 | 11.1 |
| Example 7 | 13.0 |
| Example 8 | 13.1 |
| Example 9 | 9.3 |
| Comparative Example 3 | 8.8 |
| Comparative Example 4 | 8.9 |
| Comparative Example 5 | 7.0 |
| Example 10 | 8.2 |
| Example 11 | 12.5 |
| Example 12 | 11.0 |
| Example 13 | 13.0 |
| Example 14 | 12.8 |
| Example 15 | 14.8 |

As compared with Comparative Example 1 in which the powder had a uniform structure, Comparative Example 2 in which the amount of ceria in the surface layer portions was larger than that of the present invention, and Comparative Examples 3 and 4 in which the oxide contained on the surface side to be supported on the core material did not contain ceria, the catalysts of Examples 1 to 9, and 11 to 15 exhibited a higher degree of noble metal dispersion. Also, the catalyst of Example 10 exhibited a higher degree of noble metal dispersion than the catalyst of Comparative Example 5. In particular, in the samples of Examples 5 to 8, and 11 to 15 that contained a large amount of rare earth elements other than Ce exhibited a high degree of noble metal dispersion. This suggests that the addition of rare earth elements other than Ce effectively acts on the heat resistance of the carrier and the suppression of sintering of noble metal due to interaction between the noble metal and the carrier.

From the above, it is clear that the catalyst powder and the catalyst according to the present invention are excellent for the purification of exhaust gas in an internal combustion engine, in particular, the purification of exhaust gas generated at low/medium temperatures, and are also excellent in terms of maintaining the catalytic activity of noble metal at a high level.

The invention claimed is:

1. A catalyst powder comprising: a core portion that contains ceria and zirconia; and a surface layer portion that is located on the core portion and that contains ceria and zirconia, wherein a ratio ($M_2/M_1$) is 0.30 or more and 0.95 or less, the ratio ($M_2/M_1$) being a ratio of a mole fraction $M_2$ (mol %) of cerium in the surface layer portion measured using X-ray photoelectron spectroscopy to a mole fraction $M_1$ (mol %) of cerium in the entire powder, and wherein the core portion contains a rare earth element oxide excluding cerium and/or an alkaline earth metal oxide and the surface layer portion contains a rare earth element oxide excluding cerium and/or an alkaline earth metal oxide different from that or those of the core portion.

2. The catalyst powder according to claim 1, comprising: a core particle that contains ceria and zirconia; and a supported metal oxide that is supported on a surface of the core particle and that contains ceria and zirconia, wherein the surface layer portion constitutes at least a portion of the supported metal oxide.

3. The catalyst powder according to claim 1, wherein $M_{4/2}$ ($=M_4/M_2$) that is a ratio of $M_4$ and $M_2$ is greater than 1, wherein $M_4$ (mol %) represents a mole fraction of zirconium in the surface layer portion measured using X-ray photoelectron spectroscopy, and $M_2$ (mol %) represents a mole fraction of cerium in the surface layer portion measured using X-ray photoelectron spectroscopy.

4. An exhaust gas purification catalyst comprising: the catalyst powder according to claim 1; and a noble metal that is supported on the catalyst powder.

5. The catalyst powder according to claim 1, wherein the mole fraction $M_2$ (mol %) of cerium in the surface layer portion is 1.0 mol % or more and 30.0 mol % or less.

6. The catalyst powder according to claim 1, wherein a ratio ($M_{4/2}/M_{3/1}$) between $M_{3/1}$ and $M_{4/2}$ is 1.1 or more and 5.0 or less, wherein $M_{3/1}$ ($=M_3/M_1$) represents a ratio between a mole fraction $M_3$ (mol %) of zirconium in the entirety of the powder and a mole fraction $M_1$ (mol %) of cerium in the entirety of the powder, and $M_{4/2}$ ($=M_4/M_2$) represents a ratio between a mole fraction $M_4$ (mol %) of zirconium in the surface layer portions measured using X-ray photoelectron spectroscopy and a mole fraction $M_2$ (mol %) of cerium in the surface layer portions measured using X-ray photoelectron spectroscopy.

7. The catalyst powder according to claim 1, wherein the catalyst powder contains 5 parts by mass or more and 20 parts by mass or less of a rare earth element oxide excluding ceria and/or an alkaline earth metal oxide, relative to 100 parts by mass of the entirety of the powder.

8. The catalyst powder according to claim 1, wherein a ratio ($M_5/M_2$) is 0.3 or more and 3.0 or less, the ratio ($M_5/M_2$) being a ratio of a mole fraction $M_5$ of a rare earth element excluding cerium and/or an alkaline earth metal element in the surface layer portion measured using X-ray photoelectron spectroscopy to the mole fraction $M_2$ of cerium in the surface layer portions.

* * * * *